Nov. 11, 1969  H. R. ASK  3,477,152
CONTROL OF EARTHMOVING MACHINERY
Filed Dec. 28, 1966  4 Sheets-Sheet 4
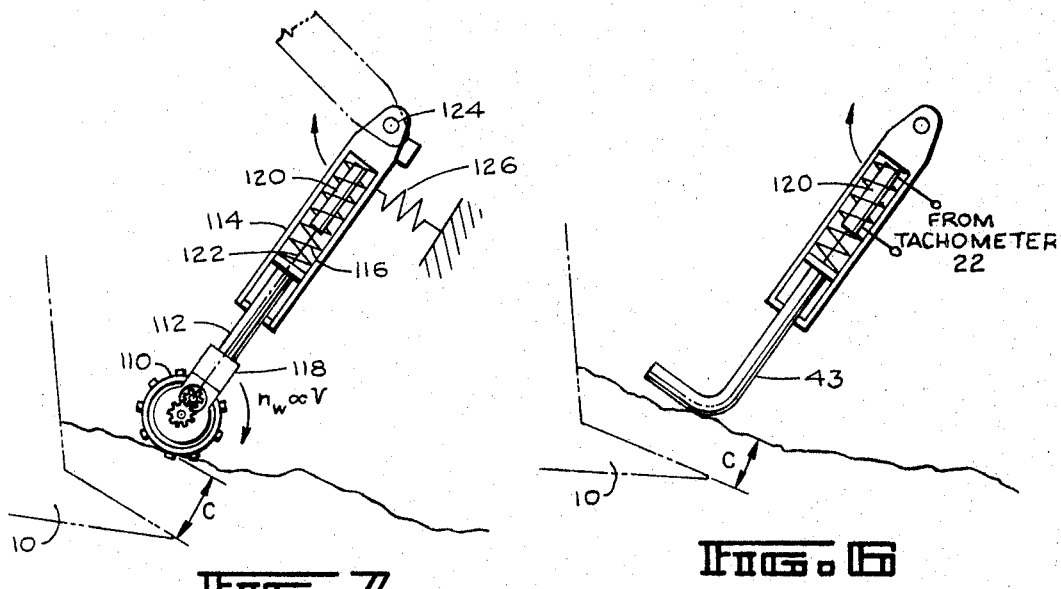
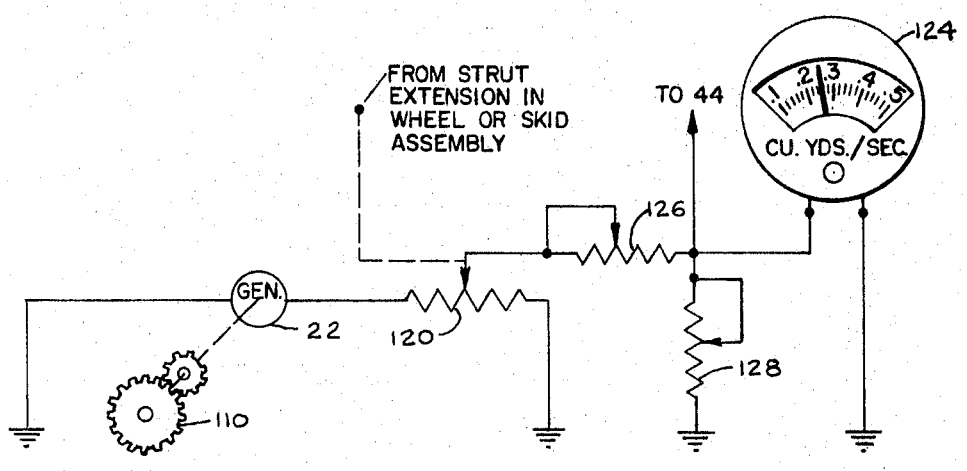
INVENTOR.
HENRY R. ASK
BY *Fishman & Van Kirk*
ATTORNEYS.

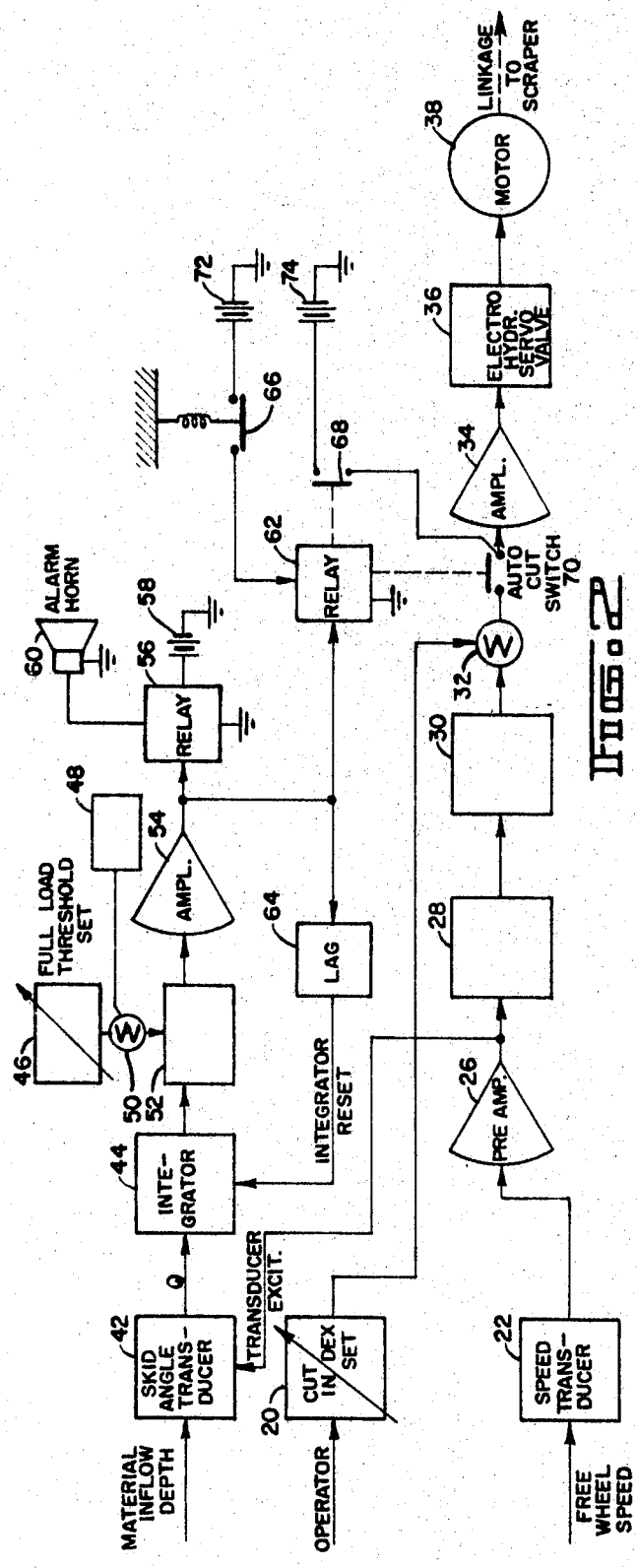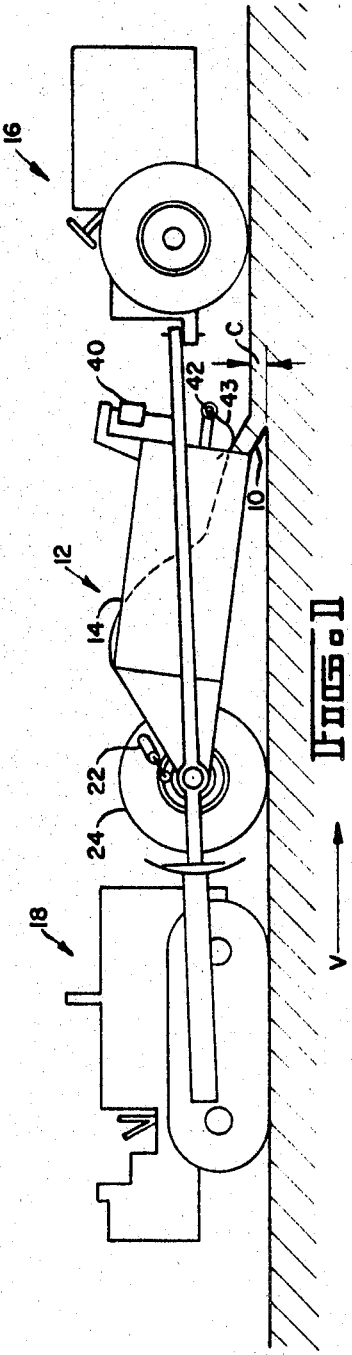

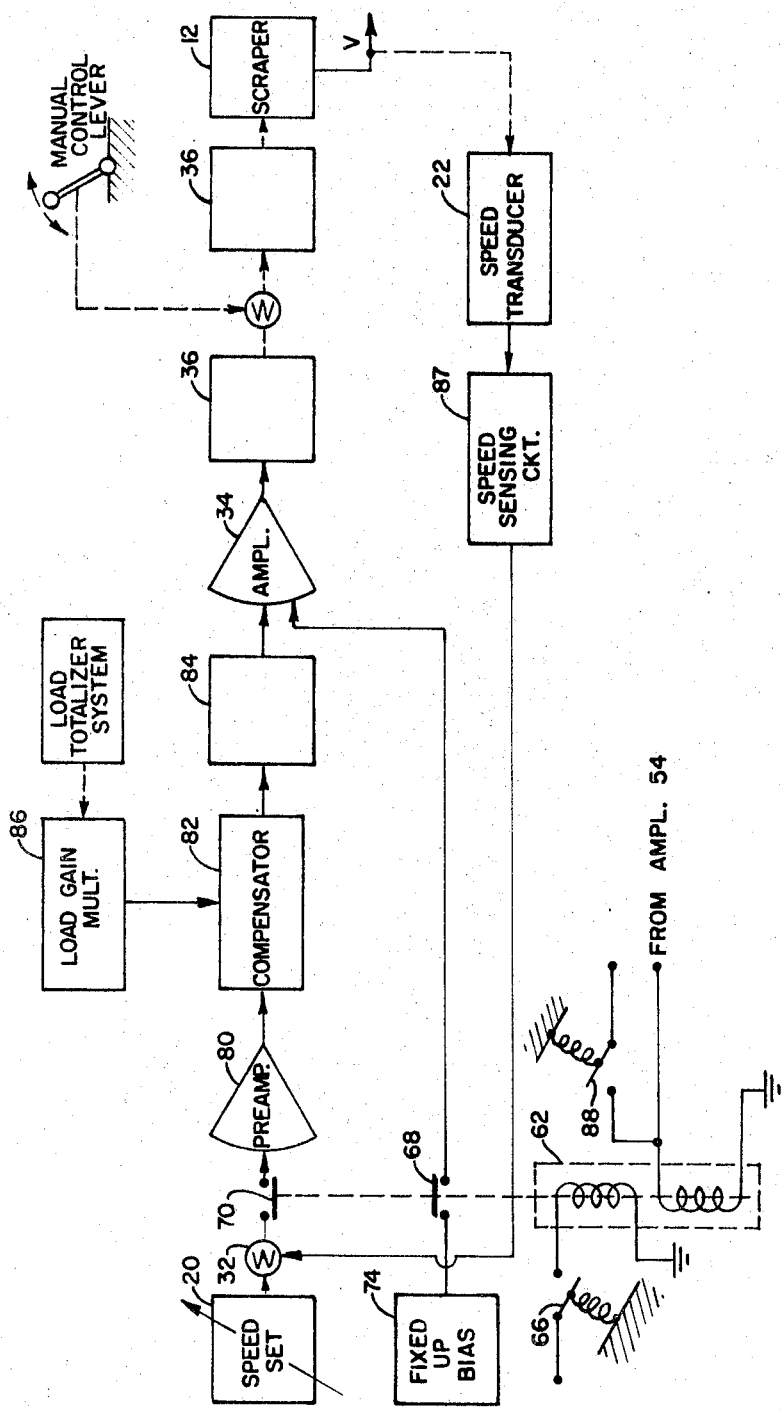

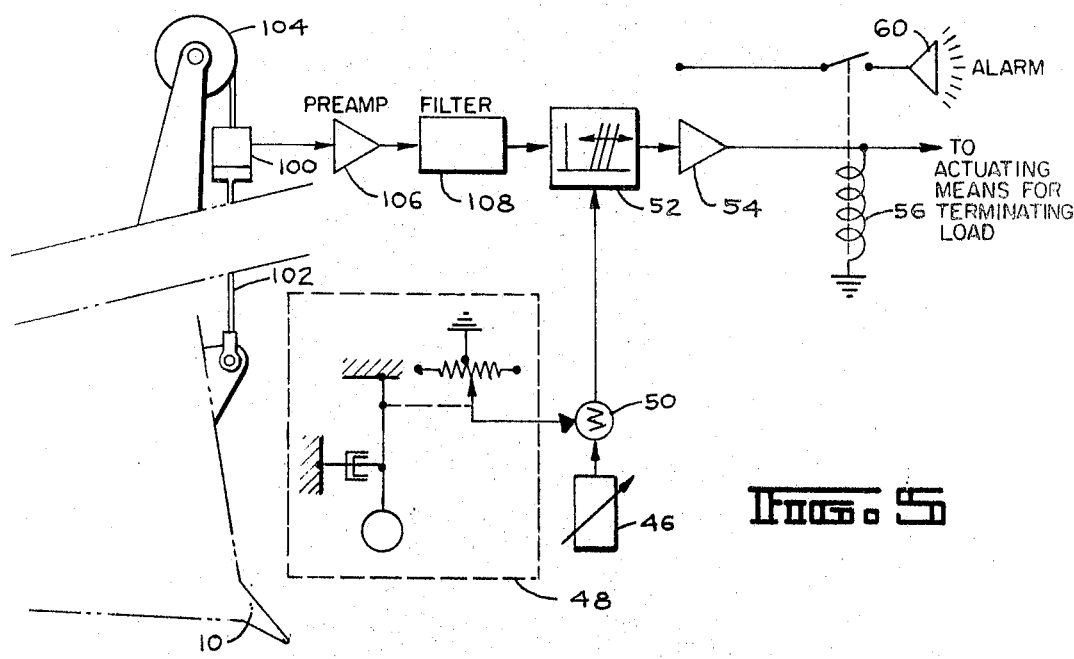
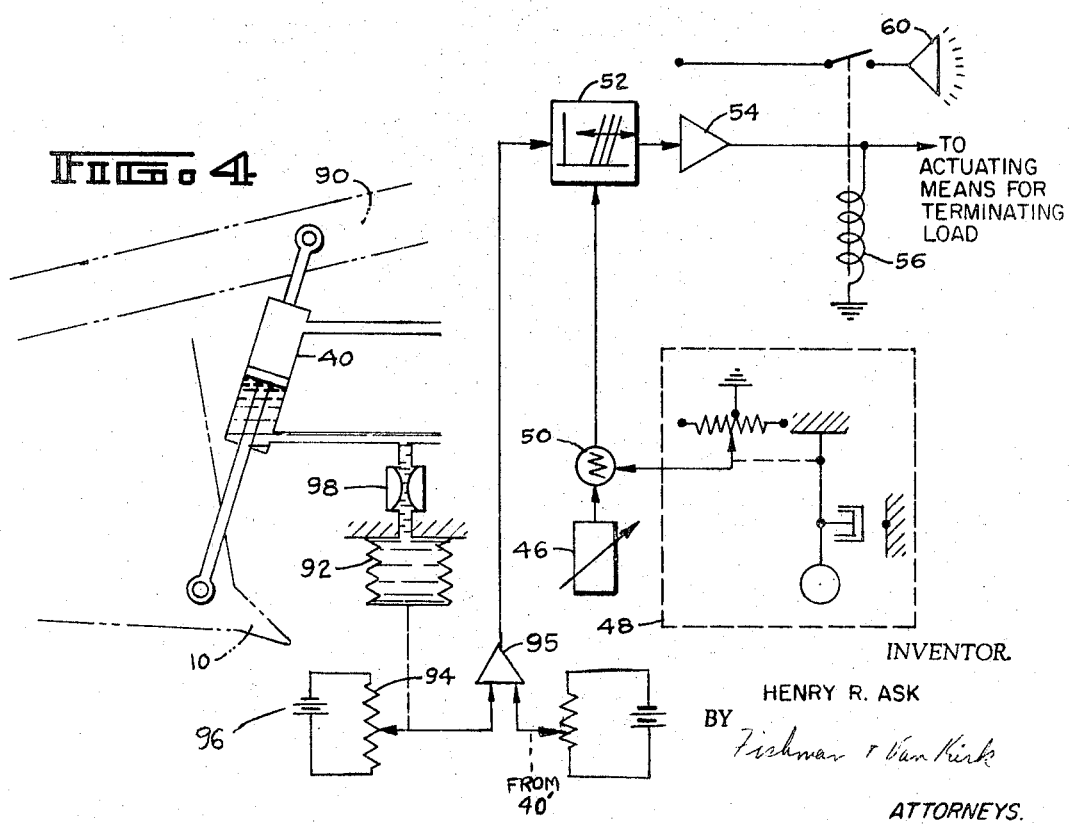

United States Patent Office 3,477,152
Patented Nov. 11, 1969

3,477,152
CONTROL OF EARTHMOVING MACHINERY
Henry R. Ask, Wapping, Conn., assignor to United Aircraft Corporation, East Hartford, Conn., a corporation of Delaware
Continuation-in-part of application Ser. No. 537,556, Mar. 25, 1966. This application Dec. 28, 1966, Ser. No. 605,441
Int. Cl. E02f 3/84; G01g 23/18; A01b 63/14
U.S. Cl. 37—129                           27 Claims

ABSTRACT OF THE DISCLOSURE

A control for earthworking and moving vehicles wherein the actual forward speed of the vehicle is measured and compared with a preselected speed, the selected speed being a function of the characteristics of the material being worked, to provide a speed error signal which is employed to control the position of an earth working blade on the vehicle to thereby maintain the optimum depth of cut of the blade. The system also measures the amount of material which has been loaded on self-loading equipment in order to provide a fully loaded condition indication, the fully loaded indication being employed to lift the blade out of the cut.

---

This application is a continuation-in-part of application Ser. No. 537,556, filed Mar. 25, 1966, now abandoned.

The present invention relates to the control of earthmoving vehicles. More particularly, the present invention is directed to optimizing the operating time of such vehicles and other similar apparatus. Accordingly, the general objects of this invention are to provide new and improved methods and apparatus of such character.

While not limited thereto in its utility, the present invention is particularly well suited for use with earthmoving equipment employing a scraper blade for dislodging material to be moved and a bowl or scoop section for transportation of the thus dislodged material. Accordingly, this invention will be described with relation to self-loading machinery characterized by a cutting edge and commonly utilized to move earth from one location to another. The problem of the automatic or semi-automatic control of such machinery is one of long standing in the art. This control problem may be broken down into two basic difficulties. The first and most obvious of these difficulties is precipitated by a lack of experienced equipment operators. It generally takes a great deal of training and experience before an operator becomes proficient at the use of the machinery in question. In the case of the military, enlistments often expire before the operators can acquire the necessary experience. In addition, the military would benefit tactically by having equipment operated anywhere with unskilled operators. Thus, automatic control of the machinery is not only desirable, but in some cases, mandatory.

The second of the aforementioned difficulties, and one which confronts even experienced operators, is that of optimizing the time-load factor. For most operations, it is desired to optimize the operating time of the machinery as opposed to operating the machinery at peak efficiency. In the art, this failure or inability to optimize the load cycle is known as "spending too much time in the cut." As previously noted, even experienced operators often "spend too much time in the cut" both because the cutting or scraping blade is not set at the best depth and also, due in part to restricted visibility to the rear, because the scraping operation will be terminated with either an over-filled or under-filled scoop.

In the past, attempts at automatic or semi-automatic control of earthmoving machinery have been aimed at causing such machinery to operate at its maximum fuel efficiency. In so doing, these prior art control devices have usually measured the slippage of the tractive means for such earthworking machinery and have employed signals commensurate therewith to alter the loading of the machinery. By controlling the load imposed on or by the machinery so that maximum horsepower output of the motor of the driving means is utilized, economy of operation may theoretically be obtained. However, maximum economy of operation is rarely commensurate with optimization of the operating time of the machinery.

The present invention overcomes the aforementioned problems by enabling the semi-automatic control of earthmoving vehicles and minimizing the operator training and experience required therefor.

It is therefore an object of this invention to provide for the control of earthmoving machinery.

It is also an object of this invention to minimize the operator attention and skill needed for the operation of an earthmoving vehicle.

It is a further object of this invention to optimize the time-load factor of an earthmoving vehicle.

It is yet another object of this invention to automatically terminate the loading of an earthmoving vehicle when it has reached its desired capacity.

It is still another object of this invention to automatically control the cut depth of the blade of an earthmoving vehicle employing a scraper type blade.

It is also an object of this invention to provide a signal indicative of a fully loaded condition to operators of earthmoving equipment.

It is another object of this invention to provide a material inflow rate signal to operators of self-loading earthmoving equipment.

These and other objects of this invention are accomplished by sensing the speed at which the earthmoving vehicle is actually moving relative to the surface of the terrain being worked. After suitable processing, a signal commensurate with speed is compared to a preset reference indicative of the desired vehicle speed. The error signal thus generated is employed to control the blade assembly lift actuating mechanism in such a manner as to maintain the optimum depth of blade cut. The present invention also comprises means for generating a signal indicative of the amount of material in the scoop or bowl of self-loading equipment. This signal is compared with a preset full load signal to provide an indication of when the fully loaded condition is achieved. The full load indication can be employed to provide a cut termination signal to the operator and/or to cause the blade assembly lift actuating mechanism to lift the blade out of the cut. The present invention further comprises means for sensing the rate at which material is flowing into the scoop and, if desired, for providing an inflow rate indication. The material inflow rate signal may be totalized to provide the aforementioned signal indicative of material in the scoop.

This invention may be better understood and its numerous advantages will become apparent to those skilled in the art by reference to the accompanying drawing wherein like reference numerals refer to like elements in the various figures and in which:

FIGURE 1 is an illustration of earthmoving machinery of the type with which the present invention may be employed.

FIGURE 2 is a block diagram of a first embodiment of a semi-automatic control in accordance with the present invention.

FIGURE 3 is a block diagram of a second embodiment of a portion of the apparatus of FIGURE 2.

FIGURE 4 is a schematic showing of a first embodiment of means for generating a fully loaded signal in accordance with the present invention.

FIGURE 5 is a schematic showing of a second embodiment of means for generating of fully loaded signal in accordance with the present invention.

FIGURE 6 depicts a first embodiment of a sensor that may be utilized to provide a material inflow rate signal in accordance with the present invention.

FIGURE 7 depicts a second embodiment of a sensor that may be utilized to provide a material inflow rate signal in accordance with the present invention.

FIGURE 8 is a schematic showing of a material inflow rate indicator in accordance with the present invention.

The general operation of a tractor-scraper rig of the type shown in FIGURE 1 involves loading, transit, off-loading and return cycles. The loading cycle usually involves the greater portion of the total cycle time and requires the highest level of operator skill. The present invention permits optimization of the loading cycle. Referring to FIGURE 1, the loading operation consists of lifting a gate, not shown, and lowering the blade 10 of the scraper 12. The rig then proceeds forward scraping and loading simultaneously; the material dislodged by blade 10 being forced into bowl 14 of the scraper assembly. The scraper is pulled by a tractor 16 and additional tractive effort when the rig is in the cut may be supplied by a pusher tractor 18. If the operator, riding on tractor 16, has blade 10 set shallow, the vehicles are proceeding forward at saturation speed determined primarily by the governor setting of pusher tractor 18 or by the scraper governor on tractor 16 if self-loading. The volume rate of material inflow into bowl 14 is, under these conditions, light and the time to full load is excessive.

If blade 10 is set too deep, the rig experiences excessive tractive slippage and again the volume rate of material inflow is low and the time to full load is excessive. Since materials of different composition have different full load time versus cut depth curves, the main control criteria is to maximize the material inflow rate and to minimize the time to full load. The second major factor which influences "time in the cut" is the operator's skill in determining when the bowl 14 is fully loaded. The general tendency is for operators to continue to load beyond the optimum point whereby material is lost overboard in the cut or in transit. The second major control criterion is, therefore, to sense the amount of material in the bowl and to signal the system and/or operator to terminate the load cycle when the bowl is fully loaded.

Referring now to FIGURE 2, a block diagram of a preferred embodiment of a control system which optimizes the load cycle is shown. For a given load material, there is a best combination of cut depth C and vehicle speed V to maximize the material inflow rate. Also, for optimum conditions, the actual vehicle velocity remains fairly constant. This is due to the fact that the governed engine speed of the means supplying the tractive power should be held nearly constant to obtain maximum horsepower and a maximum occurs in tractive force versus slip for most materials. Therefore, over the load cycle, the actual optimum speed of the vehicle over the earth will be largely invariant to transmit maximum horsepower. It may also be noted that most load materials exhibit best tractive effort around 50 percent of slip speed.

From the foregoing, it follows that the desired optimum velocity of the vehicle, for a given load of material, is nearly constant. Thus, by controlling the actual speed of the vehicle to a predetermined value by varying the cut depth, a near optimum condition will be obtained. That is, if the actual speed of the vehicle over the earth is such that maximum work can be accomplished, then the maximum cut that will result from maintaining this speed will be that value which results in a maximum material inflow rate Q. The material inflow rate is, of course, a function of the product of actual vehicle speed V and the depth of cut C. Obviously, to achieve maximum Q, the equipment operator or site engineer must readjust the velocity reference as the load material characteristics change.

In FIGURE 2, the control velocity reference comprises a variable voltage source 20. Source 20 will be presented to the operator as a cut index set so that, when setting his speed reference, he will merely dial in a number commensurate with the hardness of the material to be worked. At the same time he is adjusting reference source 20, the operator will also set in, via the throttle control of tractor 16 or 18, the optimum prime mover engine speed reference. The actual vehicle speed over the earth may be measured by a transducer 22 mounted on an undriven wheel. As may be seen from FIGURE 1, transducer 22, which may comprise a conventional tachometer generator, is associated with one of rear wheels 24 of scraper 12. If the equipment is such that it does not have an undriven wheel, a fifth wheel may be provided for measuring actual over-the-earth velocity. A sensor based on the use of a fifth wheel, which sensor measures the speed of vehicle relative to the material being dislodged, is shown in FIGURE 7.

The signal from the speed sensor is amplified in amplifier 26 and is thereafter processed in demodulator 28 and filter 30. Demodulation and filtering is employed since the output of the speed sensor tachometer generator will usually be an A.C. signal and, in order to provide a control signal whose polarity will indicate the direction of desired movement of the controlled element, direct current output signals from the system are desired. The actual speed signal from filter 30 is compared in a summing circuit 32 with the speed reference signal from manually adjustable voltage source 20. The speed error signal generated in summing circuit 32 is, in a manner to be more fully described below, applied to direct current amplifier 34 and thence to the control means for blade 10. The blade control means will, in the usual instance, comprise an electro-hydraulic servo valve 36 and a hydraulic actuator or motor 38. Motor 38, in a manner well known in the art, operates a plurality of cut control actuator hydraulic cylinders 40 (FIGURE 1) to change the angle of scoop 14 and thus raise or lower blade 10.

The material inflow depth may be sensed by a skid angle transducer 42 comprising a skid member 43 (FIGURES 1 and 6) which contacts the surface of the material flowing into scoop 14 over blade 10. In a preferred embodiment, excitation for transducer 42 is supplied by the speed signal from amplifier 26. Thus the output of transducer 42 will be a signal proportional to the product of cut depth C and actual over-the-earth velocity V. The product of cut depth and velocity is the rate of material inflow Q. This rate of material inflow signal is applied to an integrator 44. Integration of the material inflow rate signal in integrator 44 enables the system to function as a volume totalizer. Integrator 44 may comprise a servo loop with a tachometer generator feedback so that the material inflow rate is totalized continuously.

A full load reference signal is set into the system by manual adjustment of the output of variable voltage source 46. Significant grades, particularly at right angles to the loading path, have a profound effect on the amount of material that can be heaped or carried in scoop 14. Therefore, the average rig tilt angle may be measured and a signal commensurate therewith generated by a simple well damped pendulous reference 48 (see FIGURES 4 and 5) or other similar sensor of a type known in the art. The output signal from sensor 48, when employed, is opposite in polarity to the full load reference signal from source 46 and these two signals are summed in a summing circuit 50. The output of summing circuit 50 is applied to a comparator circuit 52 wherein it is compared to the totalized material inflow rate signal provided by integrator 44. The output of comparator circuit 52 is applied to amplifier 54 and thence to relay 56. Relay 56 is normally energized by the output of amplifier 54 and its contacts are accordingly normally open. However, as scoop 14 is filled, the output of comparator circuit 52 decreases toward a null value. When the totalized inflow signal from integrator 44 is equal to the modified full load threshold signal from source 46, there will be no output from comparator 52 and accordingly no latching signal provided by amplifier 54. Relay 56 is thus deenergized and its contacts closed permitting current to flow from source 58 through an alarm horn 60. In this manner, the operator is provided with an audible signal as to when he should terminate the loading cycle.

The output of amplifier 54 is also applied, via a lag circuit 64, to integrator 44 to reset the integrator at the end of a load cycle. If automatic load cycle termination is desired, the output of amplifier 54 may also be applied to a latching relay circuit 62. Latching relay 62, in a manner to be described more fully below, is activated by momentary depression of the operator's start button 66 and will switch back to its initial state upon the receipt of a full load indication from amplifier 54. Latching relay 62 operates switches 68 and 70, is initially energized by current from source 72 and controls the application of a full up blade bias signal from source 74 to amplifier 34.

In operation, the operator of the equipment or site engineer will adjust sources 20 and 46 to respectively set in a cut index (speed) reference signal and a full load reference signal. At this time, a speed error signal appears at the output of summing circuit 32. However, before the start of the load cycle, this speed error signal is disconnected from amplifier 34 since automatic cut switch 70 is open. At this point the equipment is moving with the blade 10 full up, the full up blade bias signal being provided by bias source 74 and applied via normally closed contacts of switch 68 to the input of amplifier 34. To start the load cycle, the operator momentarily depresses the "start load" button thus closing switch 66 and permitting current flow from source 72 through latching relay 62. Closing of switch 66 momentarily energizes relay 62 causing the opening of the normally closed contacts of switch 68 and the closing of switch 70. As indicated, relay 62 is a latching relay and thus the normally closed contacts of switch 68 will remain open and switch 70 will remain closed until relay 62 is unlatched. At the instant of closing of switch 70, the speed error signal from summing circuit 32 is positive since the rig prime mover is unloaded. When applied to amplifier 34, this positive speed error signal causes a blade down command and the control then seeks that value of cut depth which will satisfy the velocity reference commensurate with the signal generated by the cut index reference 20. As noted above, the output of amplifier 34 is applied to an electro-hydraulic actuator comprising elements 36 and 38 which, in turn, control hydraulic valves on the blade lift mechanism 40. In its simplest form, the actuator would be a solenoid which would move the manual blade control lever rapidly to its proper position.

When full load for the terrain is indicated by the absence of an input to amplifier 54 from comparator 52, relay 56 will be deenergized and alarm horn 60 will sound. At the same time relay 62 will be unlatched and, after a suitable delay, integrator 44 reset. Unlatching of relay 62 causes opening of switch 70 and reclosing of the normally closed contacts of switch 68. Reclosing of the normally closed contacts of switch 68 applies the fixed, full blade up bias from source 74 to amplifier 34 and a full blade up signal is thus delivered to the blade lift mechanism. The operator then maneuvers the rig to the desired unloading point and, after unloading and returning to the cut site, another load cycle will be initiated.

A second embodiment of the speed control portion of the system of FIGURE 2 is shown in FIGURE 3. While operating on basically the same principles as the FIGURE 2 control, the system of FIGURE 3 is more sophisticated. The FIGURE 3 system provides proportional plus rate control action. The velocity error signal from summing circuit 32, after amplification in a preamplifier 80, is applied to a compensation circuit 82. Compensation circuit 82 differentiates the speed error signal with respect to time thereby providing the rate control which may be required for stable closed loop operation. The differentiated error signal is then summed with the proportional error signal and applied to a modulator circuit 84 which generates a width modulated pulse train, the magnitude and polarity of the speed error signal determining the width and polarity respectively of the pulses. The total error signal sensitivity varies inversely with load. This is due to a fixed cut depth increment producing a greater change in blade reaction force for an increasing amount of material in the bowl. It may therefore be necessary or desirable to continually adjust the sensitivity of the control. The output of the load totalizer system (from comparator 52 of FIGURE 2) is applied to a load gain multiplier 86 and thence to compensation circuit 82. In a manner well known in the art, the output of load gain multiplier 86 varies the gain of compensation circuit 82 (differentiator-summer) so that error signal sensitivity varies inversely with load. It should be noted that the speed signal from transducer 22 is demodulated in a speed sensing circuit 87 prior to being supplied to summing circuit 32. Circuit 87 senses a change in tachometer frequency and puts out a D.C. voltage proportional to frequency which, in turn, is proportional to speed. A circuit with these characteristics is disclosed in U.S. Patent No. 3,119,055 issued Jan. 21, 1964, to H. E. Martin.

Operation of the speed control system of FIGURE 3 is basically the same as the FIGURE 2 system. That is, upon the operator's closing of switch 66, latching relay 62 causes the opening of the normally closed contacts of switch 68 and the closing of switch 70. The speed error signal is thereupon applied via preamplifier 80, compensation circuit 82 and modulator 84 to amplifier 34. Upon receipt of a full load indication, or upon the closing of a manual stop load button 88, the latching relay will be returned to its original condition thereby the opening switch 70 and closing the normally closed contacts of switch 68. Closing of the normally closed contacts of switch 68 applies the fixed up bias from source 74 to amplifier 34 thereby causing the blade to be withdrawn from the cut.

As described above, the degree of loading or instantaneous quantity of material in the bowl of the equipment was measured by sensing and totalizing the inflow rate of the material being dislodged by the scraper blade 10. Alternatively, the degree of loading may be measured by sensing the weight of material in the scoop or bowl. FIGURES 4 and 5 show systems for generating signals commensurate with the load in the scraper bowl as a function of weight and for generating a fully loaded warning signal and loading operation termination signal.

First considering the embodiment of FIGURE 4, this system is the type which would be employed upon equipment wherein the scraper bowl assembly is raised and lowered by means of hydraulic rams which are generally called lift jacks. A single such hydraulic ram 40 is shown schematically in FIGURE 1 and is shown in a cross section in FIGURE 4. At least a second ram 40' and associated sensor, not shown, will be mounted on the opposite side of the apparatus. In FIGURE 4, hydraulic ram 40 is connected between bowl 12, at a point adjacent blade 10, and the main frame number 90 of the scraper assembly. Blade 10 may be lowered or raised out of the cut by means of varying the pressure differential across the piston in ram 40. The weight of the material in the scraper bowl is measured by sensing the pressure in the lower portion of the lift jack hydraulic cylinder. Cylinder pressure is sensed by a pressure sensitive assembly such as bellows 92. Alternatively, the pressure may be sensed by a bourden tube. Bellows 92 is mechanically coupled to and thus drives the arm of a potentiometer 94 which is connected across a voltage source 96. At least one orifice, such as orifice 98, is placed in the hydraulic line between the pressure sensor and the hydraulic cylinder to average out fluctuations in cylinder pressure produced by blade load transients and cut depth commands.

As the weight of material in the scraper bowl increases, the hydraulic cylinder pressure required to maintain the preselected cut depth similarly increases. The increase in pressure in the lower portion of ram 40 causes bellows 92 to extend thus driving the arm of potentiometer 94 downwardly and increasing the magnitude of the signal appearing at the arm of the potentiometer. The signal from potentiometer 94 and a similar signal from the circuitry associated with the oppositely disposed lift jack 40' are applied as inputs to an averaging circuit 95. Averaging circuit 95 balances out erroneous signals such as will be developed due to uneven terrain causing an apparent shift of the load toward one side. The signal from circuit 95 is applied as an input to comparator circuit 52. As noted above in the description of FIGURE 1, comparator circuit 52 also has applied as an input thereto a full load threshold signal from source 46. This full load threshold signal may be modified in summing circuit 50 by a rig tilt angle signal provided by pendulous reference 48. The output of comparator circuit 52, in the manner above described, will provide a fully loaded indication when the signal commensurate with weight of material in the scraper bowl, as provided by pressure sensor 92 and potentiometer 94, is balanced by the full load reference signal from summing circuit 50.

FIGURE 5 depicts a second device for generating a fully loaded signal as a function of weight of material in the bowl. The device of FIGURE 5 may be used on scraper equipment employing a cable hoist system for raising and lowering blade 10. The system of FIGURE 5 differs from that of FIGURE 4 in that a load cell 100 is connected in series with cable 102 which, by means of a winch 104, causes vertical movement of the blade and bowl. Load cell 100 measures cable tension which, of course, is proportional to weight of material in the bowl. The signal from load cell 100, which may be a strain gauge type of transducer, is amplified in a preamplifier 106 and the output of preamplifier 106 is filtered in filter 108 to remove load transients. The filtered load signal is thereafter applied to comparator circuit 52 and the remainder of the circuit functions as above described.

With both the embodiments of FIGURES 4 and 5, the threshold or fully loaded signal would be adjustable to a setting determined by the load material specific weight or set experimentally during an initial cut. If the experimental set method is employed, the operator will note when the bowl is full and will readjust source 46 so that the fully loaded signal will be generated slightly before the point at which visual observation indicates the bowl is filled.

It is worthy of note that the systems for measuring degree of loading by sensing weight are characterized by high reliability in that they are not susceptible to fooling or fouling. The weight measuring systems are also inherently self compensating for down grades. That is, when cutting a downgrade, the full load center of gravity is forward of its normal position. Therefore, a larger percentage of the total loaded weight is on the cables or lift jacks. However, the forward center of gravity shift will offset the tendancy of the down grade to produce an apparent measured lesser load weight due to the cosine of the elevation angle. Thus, with the weight measuring systems of FIGURES 4 and 5, loading is terminated with less weight of material in the bowl than would be accumulated with the same system working level terrain and this is desirable since, when working a down grade, less heaping of the load is possible. Of course, the opposite effect is realized in the rare instance when up grade loading is attempted. However, as a general rule, loading on the up-slope is avoided since it requires more horsepower.

As noted above, the present invention encompasses the generation of a material inflow rate or Q signal. The Q signal is generated by sensing the depth of material flowing into the bowl over the blade and multiplying this inflow depth signal by a signal commensurate with the actual forward velocity of the vehicle. With present tractor scraper rigs, the operator has no way of knowing whether the inflow rate of material is the maximum that can be supported by the particular rig combination. If the rig stalls, it becomes obvious that a lesser cut should be taken. However, this is at best a poor way to make the most efficient use of the power and traction available. Even if the rig does not stall, the material inflow rate may be much less than optimum. Accordingly, in systems employing the embodiment of the present invention disclosed in FIGURES 2 and 3, it is desirable to provide an indication of the actual material inflow rate so as to provide a check on the operation of the control system. The cut index (speed) reference signal can also be reset by the operator experimentally by observing what adjustment results in a maximum Q. On rigs which do not employ the control system of FIGURES 2 and 3, it becomes even more desirable to provide material inflow rate indication so that the operator can periodically adjust the cut depth and/or throttle setting to keep Q at a maximum. By maximizing the material inflow rate, the time spent in loading will automatically be minimized and efficient use of the equipment will be obtained.

FIGURES 6 and 7 disclose sensors which will provide output signals which are a direct measure of the material inflow rate. The FIGURE 7 sensor comprises a flanged drum wheel 110 which rotates about an axis attached to and normal to a strut 112. Strut 112 moves in and out of a cylinder 114 as shown against a coil spring 116 in compression. The rotation of drum 110 drives a tachometer generator through step up gearing, the gears and tachometer being located and enclosed at base 118 of the strut 112. A linear displacement transducer 120 is anchored to the base of cylinder 114 and linked to the strut by a mechanical linkage 122. Transducer 120 may be either a linear potentiometer or a transformer with a movable core.

During loading, the load material moves over the scraper blade 10 as shown at some depth C with a velocity V. The rate of rotation of drum 110 is proportional to velocity V and hence the tachometer generator output is a measure of V. Displacement of the strut and wheel subassembly with respect to the cylinder 114 is proportional to the depth of cut C since the assembly is anchored to the scraper frame assembly by means of a pivot point 124 and restraining spring 126. To obtain a direct measure of Q the tachometer generator output voltage is applied across transducer 120. Thus, the transducer output signal becomes the product of VC and is proportional to Q since Q equals KVC where K is a dimension characteristic of the particular scraper.

The sensor shown in FIGURE 7 is depicted schematically in FIGURE 8 with a suitable indicator 124. The movement of meter 124 is calibrated in cubic yards per second. All non-linearities and constants due to the system can be accounted for in the calibration of meter 124. A series trim potentiometer 126 and a parallel trim potentiometer 128 may be provided as shown to make fine adjustments to the indicating system. In view of the operating environment, the movement of meter 124 is well damped so that the meter is not responsive to short term variations in the input signal. As shown in FIGURE 8, the system is AC, no operation being performed on the tachometer generator AC output signal. However, the system can be AC or DC as desired.

It is particularly noteworthy that the sensing device of FIGURE 7 is not susceptible to the damage when wheel 110 contacts a large object such as a rock. Under such circumstances, the entire assembly pivots against restraining spring 126, the sensor returning to the proper position after the object has been passed. In addition, the sensor device will be ordinarly linked to the bowl such that the sensor will be retracted when the scraper bowl is fully raised. Employing a skid-type sensor such as shown in FIGURES 1 and 6, operation of the cut depth sensing portion of the device is the same as above described in relation to FIGURE 7. However, in the case of the sensor of FIGURE 6, the transducer 120 is energized by a signal applied from a tachometer generator 22 located elsewhere on the equipment. Typically, the tachometer generator will be mounted on an undriven wheel as shown in FIGURE 1. In the embodiment of FIGURE 6, as in the embodiment of FIGURE 7, the transducer 120 may be a linear potentiometer or transformer with movable core. Alternatively, transducer 120 may be a strain gauge type device which will generate a direct current output signal which can be delivered to the proper circuitry of an inflow rate indicator where it would be multiplied by a converted (DC) tachometer output signal.

What is claimed is:

1. Control apparatus for earthworking machinery, said machinery having means providing tractive power and a scraper blade for dislodging material, said control apparatus comprising:
   means for generating a reference signal commensurate with a preselected constant forward speed of the machinery, said speed being selected as a function of the material characteristics;
   means for measuring the actual forward speed of the machinery relative to the material and for generating a signal commensurate therewith;
   comparator means responsive to said reference and actual speed signals for generating a speed error signal in magnitude and polarity which are indicative of a deviation of actual speed from the preselected speed; and
   means responsive to said speed error signal for causing movement of the blade vertically with respect to the material, an error signal indicative of a deviation of actual speed from preselected speed causing raising or lowering of the blade as appropriate to change the load on the machinery in such a manner that actual speed will vary to null the speed error signal.

2. The apparatus of claim 1 wherein said means for measuring actual speed comprises:
   a speed transducer operatively connected to an undriven wheel on the machinery.

3. Control apparatus for self-loading earthmoving machinery; said machinery having means providing tractive power, a scraper blade for dislodging the material to be moved and a bowl into which such dislodged material is loaded; said control apparatus comprising;
   means for generating a reference signal commensurate with the optimum speed of the machinery relative to the material during dislodging thereof as a function of the material characteristics;
   means for measuring the actual speed of the machinery relative to the material and for generating a signal commensurate therewith;
   comparator means responsive to said reference and actual speed signals for generating a speed error signal indicative of a deviation of actual speed from optimum speed;
   means for measuring the instantaneous quantity of material in the bowl and for generating a signal commensurate therewith;
   means responsive to said speed error signal and to said signal commensurate with bowl material quantity for varying the magnitude of said speed error signal inversely with load; and
   means responsive to said speed error signal as adjusted for load for causing movement of the blade vertically with respect to the material, an error signal indicative of the deviation of actual speed from optimum speed causing raising or lowering of the blade as appropriate to change in the load on the machinery in such a manner that actual speed will vary to null the error signal.

4. The apparatus of claim 3 wherein said means for measuring actual speed comprises:
   a speed transducer operatively connected to an undriven wheel on the machinery.

5. The apparatus of claim 3 wherein said means for measuring quantity of material in the bowl comprises:
   means for sensing the weight of material in the bowl and for generating a signal commensurate therewith.

6. The apparatus of claim 3 wherein said means for measuring the quantity of material in the bowl comprises:
   means for sensing the rate of material inflow to the bowl of the machinery and for generating a signal commensurate therewith; and
   means responsive to said material inflow rate signal for generating a signal indicative of the total quantity of material in the bowl.

7. The apparatus of claim 6 wherein said means for sensing the rate of material inflow to the bowl comprises;
   transducer means for measuring the depth of the material flowing into the bowl over the blade and for generating a signal commensurate therewith; and
   means for multiplying said material inflow depth signal by said actual speed signal to provide a material inflow rate signal.

8. The apparatus of claim 4 further comprising:
   means for generating a signal proportional to the maximum desirable quantity of material in the bowl as a function of the characteristics of the material being dislodged;
   means responsive to said instantaneous quantity and maximum desirable quantity signals for generating a full load signal when the actual load equals the maximum desirable load; and
   means responsive to said full load signal for generating a loading operation termination signal.

9. The apparatus of claim 8 wherein said means for generating a loading operation termination signal comprises:
   means for generating a blade full up bias signal; and
   means responsive to said full load signal for applying said blade full up bias signal to said means for causing movement of the blade vertically with respect to the material whereby loading will be terminated upon the generation of a full load signal.

10. The apparatus of claim 9 further comprising:
    means for measuring the tilt angle of the machinery and for generating a signal commensurate therewith; and
    means responsive to said tilt angle signal and to said signal proportional to the maximum desired quantity of the material being loaded for reducing said maximum quantity signal in accordance with the tilt angle of the machinery.

11. The apparatus of claim 10 wherein said means for measuring actual speed comprises:
    a speed transducer operatively connected to an undriven wheel on the machinery.

12. Control apparatus for self-loading earthmoving machinery; said machinery having means providing tractive power, a scraper blade for dislodging the material to be moved and a bowl into which such dislodged material is loaded; said control apparatus comprising:
    a cut index set control for generating a blade depth of cut reference signal commensurate with the optimum speed of the machinery relative to the material as a function of the material characteristics;

means for measuring the actual speed of the machinery relative to the material and for generating a signal commensurate therewith;

means responsive to said reference and actual speed signals for generating error signals indicative of deviations of actual speed from optimum speed;

means for measuring the instantaneous quantity of material in the bowl and for generating a signal commensurate therewith;

means for generating a signal commensurate with the maximum quantity of material to be loaded as a function of the characteristics thereof;

means responsive to said actual and maximum desired quantity signals for generating a full load signal when the actual load equals or exceeds the maximum desirable load;

means for generating a blade full up bias signal;

means for causing movement of the blade vertically with respect to the material; and means responsive to said full load signal for selectively applying said speed error and blade up bias signals to said means for causing vertical movement of the blade.

13. The apparatus of claim 12 wherein said means for measuring quantity of material in the bowl comprises:
means for sensing the weight of material in the bowl and for generating a signal commensurate therewith.

14. The apparatus of claim 12 wherein said means for measuring the quantity of material in the bowl comprises:
means for sensing the rate of material inflow to the bowl of the machinery and for generating a signal commensurate therewith; and
means responsive to said material inflow rate signal for generating a signal indicative of the total quantity of material in the bowl.

15. The apparatus of claim 14 wherein said means for sensing the rate of material inflow to the bowl comprises:
transducer means for measuring the depth of the material flowing into the bowl over the blade and for generating a signal commensurate therewith; and
means for multiplying said material inflow depth signal by said actual speed signal to provide a material inflow rate signal.

16. Apparatus for providing a loading operation termination signal to the operator of a self-loading material moving machine, said machine having a vertically movable bowl into which the material to be moved is loaded and means for causing vertical movement of the bowl, the load termination signal providing means comprising:
means for measuring the actual quantity of material in the bowl and for generating a signal commensurate therewith;
means for generating a reference signal commensurate with the maximum quantity of material to be loaded; and
means responsive to said signals commensurate with actual and maximum quantities of material for generating a loading operation termination signal when the signal commensurate with actual quantity is of the same magnitude as the reference signal commensurate with the maximum quantity to be loaded.

17. The apparatus of claim 16 wherein said means for measuring quantity of material in the bowl comprises:
means for sensing the weight of material in the bowl and for generating a signal commensurate therewith.

18. The apparatus of claim 17 wherein said means for sensing weight comprises:
means operatively connected to the bowl moving means on the machine for sensing the load thereon.

19. The apparatus of claim 18 further comprising:
means for measuring the tilt angle of the machinery and for generating a signal commensurate therewith; and
means responsive to said tilt angle signal and to said signal proportional to the maximum desired quantity of the material being loaded for reducing said maximum quantity signal in accordance with the tilt angle of the machinery.

20. The apparatus of claim 16 wherein said means for measuring the quantity of material in the bowl comprises:
means for sensing the rate of material inflow to the bowl of the machinery and for generating a signal commensurate therewith; and
means responsive to said material inflow rate signal for generating a signal indicative of the total quantity of material in the bowl.

21. The apparatus of claim 19 wherein said means for sensing the rate of material inflow to the bowl comprises;
transducer means for measuring the depth of the material flowing into the bowl over the blade and for generating a signal commensurate therewith; and
means for multiplying said material inflow depth signal by said actual speed signal to provide a material inflow rate signal.

22. The apparatus of claim 20 further comprising:
means for measuring the tilt angle of the machinery and for generating a signal commensurate therewith; and
means responsive to said tilt angle signal and to said signal proportional to the maximum desired quantity of the material being loaded for reducing said maximum quantity signal in accordance with the tilt angle of the machinery.

23. Apparatus for providing a material inflow rate signal to the operator of a self-loading earthmoving machine; said machine having a scraper bowl into which the material to be moved flows during forward motion of the machine, the material being dislodged by a blade affixed to the leading edge of the bowl; said material inflow rate signal providing means comprising:
means for sensing the depth of material flowing into the bowl over the blade and for generating a signal commensurate therewith;
means for sensing the actual forward velocity of the machine and for generating a signal commensurte therewith;
means responsive to said signals commensurate with depth of material and machine velocity for generating an inflow rate signal; and
indicator means responsive to said inflow rate signal for providing a visual indication of the rate at which which material dislodged by the blade is flowing into the bowl.

24. The apparatus of claim 23 wherein said means for sensing depth of material flowing over the blade comprises:
transducer means suspended from the machine and contacting the surface of the material in the region of the blade.

25. The apparatus of claim 23 wherein the means for generating an inflow rate signal comprises:
multiplying means responsive to said depth and velocity signals for providing a signal proportional to the product thereof.

26. The apparatus of claim 25 wherein said multiplying means comprises:
transducer means, said transducer means being energized by said signal commensurate with velocity, said transducer means having a movable element positioned as a function of depth of material flowing over the blade.

27. The apparatus of claim 26 wherein said transducer means comprises:
means contacting the surface of the inflowing material in the region of the blade; and
means coupling said surface contacting means to the movable element of said transducer.

(References on following page)

References Cited

UNITED STATES PATENTS

| | | |
|---|---|---|
| 2,842,108 | 7/1958 | Sanders. |
| 3,026,638 | 3/1962 | Hayner et al. |
| 3,039,087 | 6/1962 | Huston. |
| 3,046,681 | 7/1962 | Kutzler. |
| 3,060,602 | 10/1962 | Buttenhoff _____ 37—129 |
| 3,063,576 | 11/1962 | Hofmeister _____ 214—2 |
| 3,064,371 | 11/1962 | Kutzler. |
| 3,175,631 | 3/1965 | Clamp _____ 177—46 |

ROBERT E. PULFREY, Primary Examiner

E. H. EICKHOLT, Assistant Examiner

U.S. Cl. X.R.

73—507; 116—112; 172—6; 177—45; 180—106; 324—70